United States Patent
Schmid

(10) Patent No.: US 6,743,298 B2
(45) Date of Patent: Jun. 1, 2004

(54) METHOD FOR CLEANING VEHICLE WINDOWS

(75) Inventor: Ralf Schmid, Kaltental (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 10/070,575

(22) PCT Filed: Jun. 12, 2001

(86) PCT No.: PCT/DE01/02176
§ 371 (c)(1),
(2), (4) Date: Mar. 8, 2002

(87) PCT Pub. No.: WO02/04264
PCT Pub. Date: Jan. 17, 2002

(65) Prior Publication Data
US 2002/0134401 A1 Sep. 26, 2002

(30) Foreign Application Priority Data
Jul. 8, 2000 (DE) .......................... 100 33 382

(51) Int. Cl.⁷ ................................. B60S 1/38
(52) U.S. Cl. ............ 134/6; 15/250.001; 15/250.43; 15/250.361; 15/250.48; 318/DIG. 2
(58) Field of Search ........... 15/250.361, 250.001, 15/250.02, 250.48, 250.43, 250.44, 250.04; 134/6, 1; 318/DIG. 2

(56) References Cited

U.S. PATENT DOCUMENTS

| | | | | |
|---|---|---|---|---|
| 4,180,886 A | | 1/1980 | Scherz | 15/250.04 |
| 5,070,571 A | * | 12/1991 | Arai | 15/250.001 |
| 5,724,699 A | * | 3/1998 | Bexten | 15/250.04 |
| 6,129,093 A | * | 10/2000 | Kelly | 134/6 |

FOREIGN PATENT DOCUMENTS

| | | |
|---|---|---|
| DE | 37 44 237 A1 | 7/1989 |
| DE | 197 38 232 A1 | 3/1999 |
| DE | 198 15 171 A1 | 6/1999 |
| EP | 0 334 651 A | 9/1989 |
| EP | 0 930 207 A | 7/1999 |
| JP | 4-321458 | * 11/1992 ............ 15/250.001 |

* cited by examiner

*Primary Examiner*—Gary K. Graham
(74) *Attorney, Agent, or Firm*—Michael J. Striker

(57) ABSTRACT

A method for cleaning vehicle windows by means of a wiper with a wiper strip (12), whose wiper lip (16) rests against the vehicle window.

The wiper strip (12) is set into oscillations lateral to its longitudinal direction (20) during the wiping operation and/or shortly before it is begun.

6 Claims, 1 Drawing Sheet

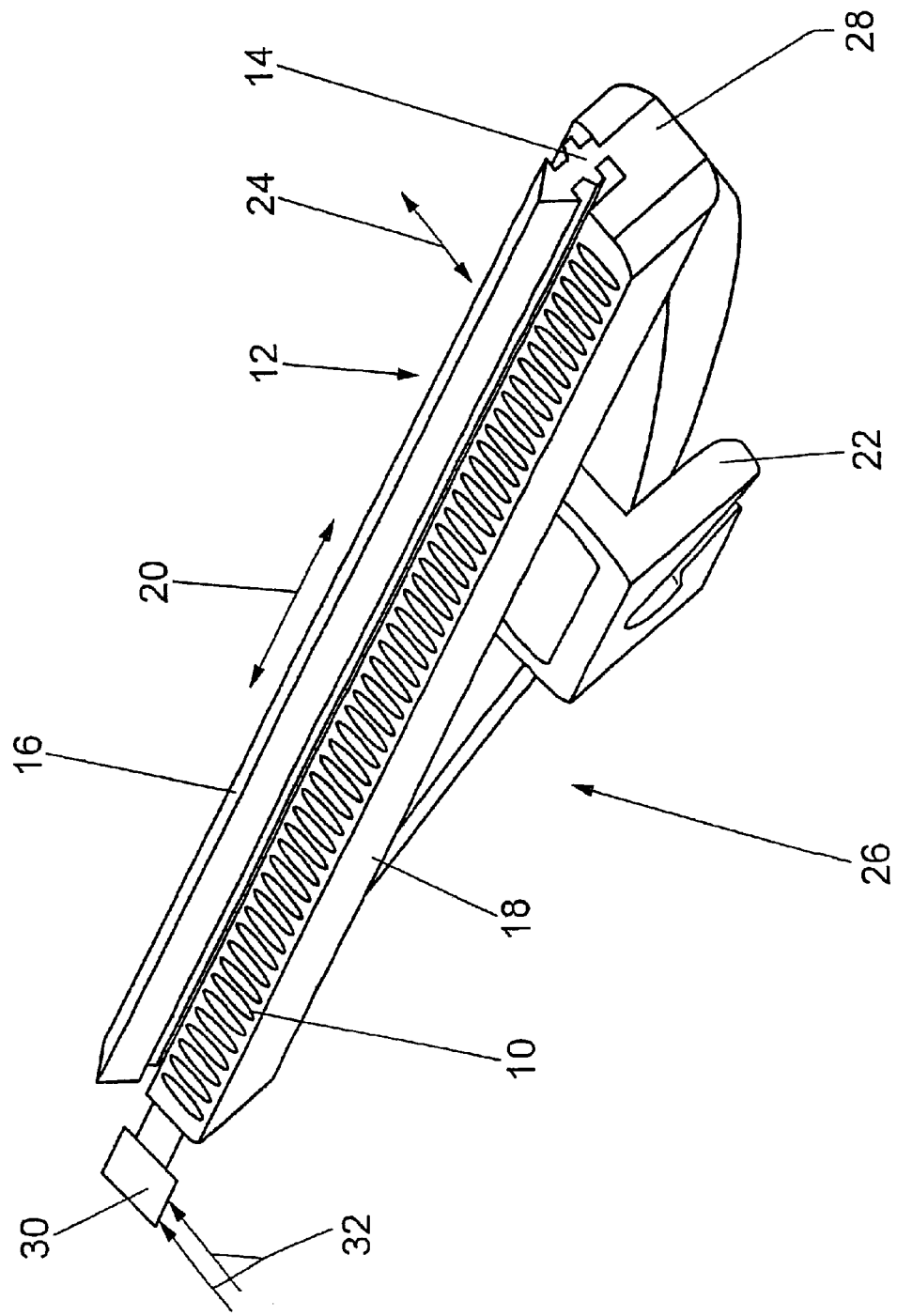

METHOD FOR CLEANING VEHICLE WINDOWS

BACKGROUND OF THE INVENTION

The invention is based on a method and apparatus for cleaning vehicle windows.

Known windshield wipers have a wiper arm, which is comprised of a fastening part and an articulating part, which is coupled to it by means of a hinge joint and has a wiper rod. A hook-shaped end of the wiper rod engages in a hook-connection housing of a wiper blade and encompasses a pivot bolt. The joint thus formed guides the wiper blade across the vehicle window during the pivoting motion. The wiper blade has a support bracket system, which as a rule has multiple parts, with subordinate brackets coupled to the center bracket, at least some of which, with claws at their ends, hold a wiper strip along its top strip. The multi-part support bracket system and spring strips inserted into the top strip make it possible for the wiper strip to adapt to a curved windshield during wiping, with a uniform contact pressure. To this end, a tension spring provides the hinge joint with an initial tension. Wipers are used to clean windshields, rear windows, and lenses of light assemblies of the vehicle. Such wipers are know, for example, from DE 37 44 237 A1.

DE 197 38 232 A1 has also disclosed a hingeless wiper blade, which has a support element that is preferably made of a thermoplastic plastic. The elastic support is elongated and is coupled in the center to a wiper rod formed onto the wiper arm. On the side facing the vehicle window, the support has a connecting surface to which the profiled back of a wiper strip is fastened, preferably by being glued in place.

As a rule, window washing systems are used in conjunction with wipers in vehicles. They are actuated when the moisture due to precipitation is insufficient for cleaning the vehicle window. They include a water tank, spray nozzles, and a pump, which supplies pressurized water, which in some cases is mixed with cleaning agents and antifreeze agents, from the water tank to the spray nozzles. The water and cleaning agent are used to dissolve dirt and insect remains on the window, which are then removed by the wiping motion of the wiper. Often, however, the time between the wiping motions is insufficient to completely dissolve the residues so that a dirty film forms on the vehicle window, which impairs the vision of the driver for quite some time.

DE 198 15 171 A1 has already disclosed fastening spray nozzles as additional components to the wiper blade and consequently distributing the spray water with a short jet length directly onto the wiping region. Since the spray water is concentrated in a region in the vicinity of the wiper blade and is wiped away again by the wiping motion in an extremely short amount of time, visibility is impaired only temporarily by the applied spray water, but the time for dissolving the dirt residue is also relatively short so that an annoying dirty film can form.

SUMMARY OF THE INVENTION

According to the invention, the wiper strip is set into oscillations lateral to its longitudinal direction during the wiping operation and/or shortly before it is begun. The frequency of the oscillations lies suitably in the ultrasonic range, preferably above 30 kHz, where the oscillations are advantageously generated by piezoelectric elements. To that end, a number of piezoelectric elements are disposed parallel to a wiper strip so that they expand lateral to the longitudinal direction of the wiper strip and exert the pressure pulses produced on the wiper strip. Consequently, the macro-movement of the wiper is combined with a micro-movement of the wiper strip, which also cleans the vehicle window in a mechanically intensive fashion. As a result, the residues on the vehicle window can usually be removed with a single wiping motion and the driver's vision is only minimally impaired, particularly if, according to one embodiment of the invention, some washing water is applied to the vehicle window close to the wiper strip during the wiping operation. Due to the favorable cleaning action, the consumption of washing water and the possibly added cleaning agent and/or antifreeze agent is sharply reduced. Due to the reduced consumption of washing water, the water tank in the engine compartment can also be reduced, which saves space for other components and saves on weight.

The piezoelectric elements are suitably controlled by an electronic control device, which can simultaneously process other signals relevant to the wiper. The control unit usefully combines the operation of the piezoelectric elements with the switching-on of the washing system so that the two functions work in tandem. Accordingly, when the piezoelectric elements are activated, washing water is simultaneously applied to the vehicle window close to the wiper strip and is wiped away by the oscillating wiper strip during the wiping operation. Mechanically loosening dried-on dirt particles while using washing water prevents the vehicle window from being scratched. In addition, the control is designed so that preferably, the piezoelectric elements are only set into oscillating motion as needed, in order to loosen residues or in order to free the wiper lip when the vehicle window has iced over. The micro-movement of the wiper strip breaks away the ice from the wiper blade rubber and the and the wiper lip is freed again without being damaged. In this connection, it is useful for the control unit to activate the piezoelectric elements as needed, before activating the wiping motion of the wiper.

The piezoelectric elements and their electrical contact points are preferably integrated into a wiper blade rubber by virtue of the fact that this wiper blade rubber is fastened with its profiled back to an elastic support. The support permits a curvature perpendicular to the vehicle window so that the wiper strip can follow the contour of the vehicle window. The wiper strip and the support comprise a component, which is added during installation of the wiper onto the vehicle and can be replaced in the event of a repair. On the one hand, this facilitates installation and on the other hand, it reduces the expenditure of time.

The method according to the invention is suitable not only for cleaning vehicle windows, but also for cleaning other surfaces, such as coatings.

BRIEF DESCRIPTION OF THE DRAWINGS

Other advantages ensue from the following description of the drawing. The drawing shows an exemplary embodiment of the invention. The drawing, the specification, and the claims contain numerous features in combination. The specialist will also suitably consider the features individually and unite them in other logical combinations.

The sole FIGURE shows a perspective view of a wiper strip with integrated piezoelectric elements.

DETAILED DESCRIPTION OF THE PREFERRED EMBODIMENTS

A hingeless wiper blade 26 is comprised of a support 18 and a wiper strip 12. The support 18 has an elongated form and its ends are curved perpendicular to the wiping direction 24 and to a vehicle window that is not shown. In the middle, the support 18 has a connecting piece 22 formed onto it, which is engaged by a wiper rod, also not shown, directly or with the interposition of adapter pieces.

The wiper strip 12 has a wiper blade rubber 14, which is connected to the support 18 in the vicinity of its profiled back 28 so that it has the same curvature as the support 18. The wiper blade rubber 14 is also elongated and, adjacent to the profiled back 28, has a wiper lip 16 formed onto it, which rests against the vehicle window in the longitudinal direction 20.

In addition to the profiled back 28, piezoelectric elements 10 are also provided in the support 18. These are disposed next to one another, parallel to the wiper strip 12, and act in the wiping direction 24 on the wiper blade rubber 14 so that it is set into high-frequency oscillations in the wiping direction 24 during the wiping operation and/or shortly before it is begun. The piezoelectric elements 10 are controlled by a control unit 30, which simultaneously processes other input signals 32 and consequently adjusts the magnitude of the high-frequency oscillations and the switch-on times.

Reference Numerals
- 10 piezoelectric element
- 12 wiper strip
- 14 wiper blade rubber
- 16 wiper lip
- 18 support
- 20 longitudinal direction
- 22 connecting piece
- 24 wiper direction
- 26 wiper blade
- 28 profiled back
- 30 control unit
- 32 input signal

What is claimed is:

1. A method for cleaning vehicle windows, comprising the following steps:

providing a wiper with a wiper strip (12) with a wiper lip, wherein the wiper lip (16) rests against the vehicle window;

providing piezoelectric elements disposed parallel to the wiper strip (12), wherein said piezoelectric elements act on a wiper blade rubber (14) in a wiping direction (24) and are controlled by an electronic control unit (30);

providing a control unit (30);

activating the piezoelectric elements (10) with the control unit (30) before activating a wiping operation when the wiper is first actuated after the vehicle has been parked and/or at outside temperatures below freezing; and setting the wiper strip (12) into oscillations lateral to its longitudinal direction (20) during the wiping operation and/or shortly before the wiping operation is begun.

2. The method according to claim 1, wherein the oscillations have a frequency in the ultrasonic range.

3. The method according to claim 1, wherein the oscillations are generated by the piezoelectric elements (10).

4. The method according to claim 1, wherein washing water is applied to the vehicle window close to the wiper strip (12) during the wiping operation.

5. The method according to claim 1, wherein the piezoelectric elements (10) are supported in a flexible support (18) perpendicular to the vehicle window.

6. The method according to claim 5, characterized in that wherein the support (18) of the piezoelectric elements (10) is formed onto a profiled back (28) of the wiper blade rubber (14).

* * * * *